United States Patent [19]

Dickison

[11] Patent Number: 4,653,710
[45] Date of Patent: Mar. 31, 1987

[54] SUPPORT TROLLEY

[75] Inventor: Maxwell Dickison, St. Marys, Australia

[73] Assignee: F. F. Seeley Nominees Pty. Ltd., St. Marys, Australia

[21] Appl. No.: 747,171

[22] Filed: Jun. 20, 1985

[30] Foreign Application Priority Data

Jun. 26, 1984 [AU] Australia .............. PG5689

[51] Int. Cl.$^4$ .......................... F16M 11/20
[52] U.S. Cl. ............ 248/188.7; 16/18 CG; 108/150; 248/163.1
[58] Field of Search .......... 248/188.7, 188.8, 188.9, 248/188.91, 188.1, 188, 163.1, 431, 129; 297/349; 108/148, 150, 111; 403/361, 359, 298; 16/18 R, 18 CG, 18 A, 18 B, 46, 47, 48

[56] References Cited

U.S. PATENT DOCUMENTS

| 2,868,602 | 1/1959 | Drezner | 248/188.8 X |
| 3,349,426 | 10/1967 | Haydock | 16/18 CG X |
| 3,466,185 | 12/1969 | Lange | 16/18 CG X |
| 3,588,015 | 6/1971 | Bereday | 248/188.7 X |
| 3,593,954 | 7/1971 | Ritchie | 297/349 |
| 3,662,428 | 5/1972 | Koehl | 248/188.8 X |
| 3,691,590 | 9/1972 | Drabert | 16/18 CG X |
| 3,719,340 | 3/1973 | Norton | 248/188.7 X |
| 3,730,570 | 5/1973 | Brochstein | 403/361 |
| 3,968,882 | 7/1976 | Mello | 248/188.7 X |
| 4,262,871 | 4/1981 | Kolk et al. | 248/188.7 |
| 4,361,930 | 12/1982 | Seesengood | 403/361 X |
| 4,365,839 | 12/1982 | Strassle | 248/188.7 X |

FOREIGN PATENT DOCUMENTS

| 1023910 | 10/1978 | Canada | 16/47 |
| 2529201 | 5/1976 | Fed. Rep. of Germany | 16/47 |
| 2025220 | 1/1980 | United Kingdom | 16/47 |

OTHER PUBLICATIONS

Trade Literature, "Profile"-Shaping the Future of Portable Air Conditioning (date unknown).
Advertisement for "Emerson . . . ed é Subito Fresco", (date unknown).

Primary Examiner—Ramon O. Ramirez
Attorney, Agent, or Firm—Baker, Maxham & Jester

[57] ABSTRACT

A support trolley comprises a central leg pillar and at least three legs radiating therefrom, each supported at its outer end by a respective castor wheel assembly. The inner end of each leg joins the lower end of the leg pillar by a sliding engagement of complementary splined surfaces, so that assembly or disassembly is easily effected. The outer end of each leg has a downwardly facing recess which receives the upwardly directed pintle of a respective castor wheel assembly, that pintle being tubular and of resilient material.

10 Claims, 5 Drawing Figures

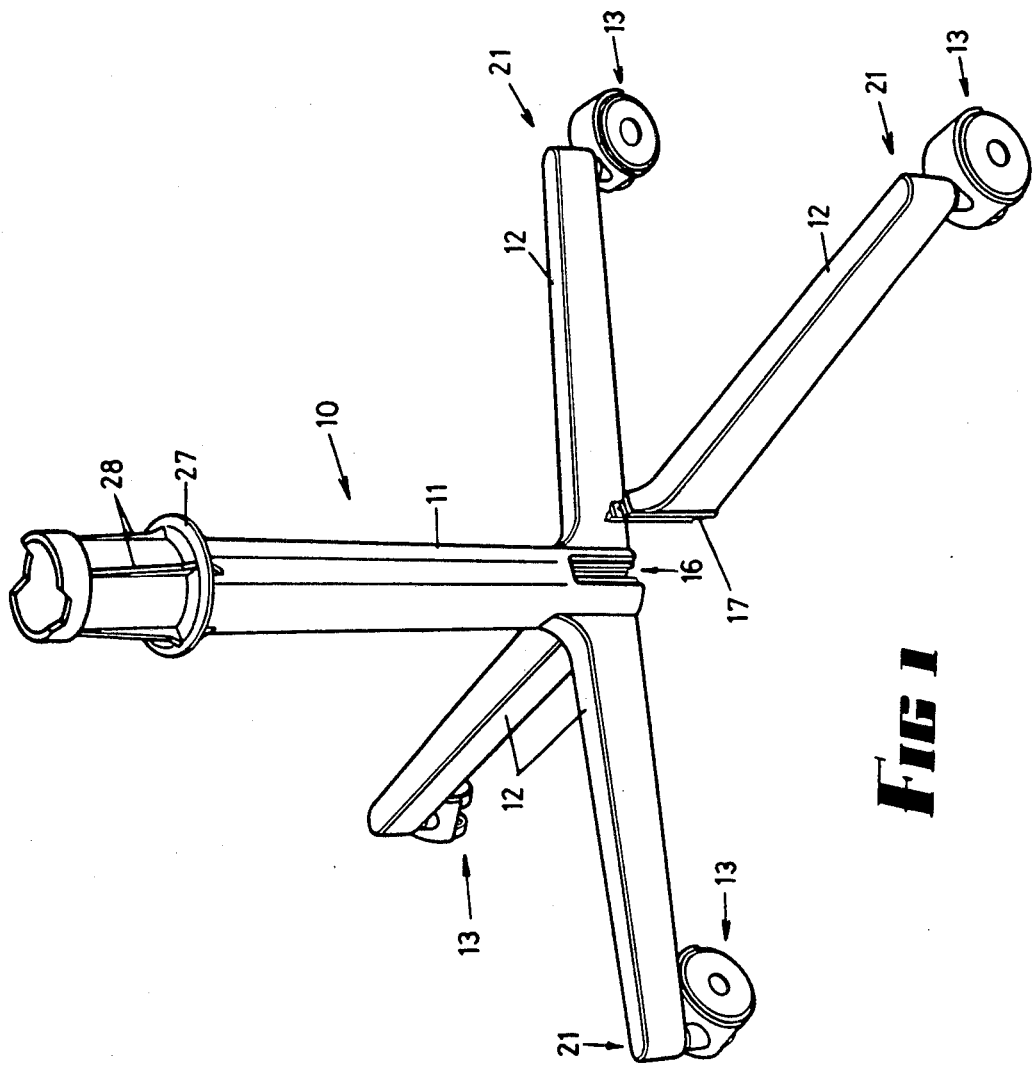

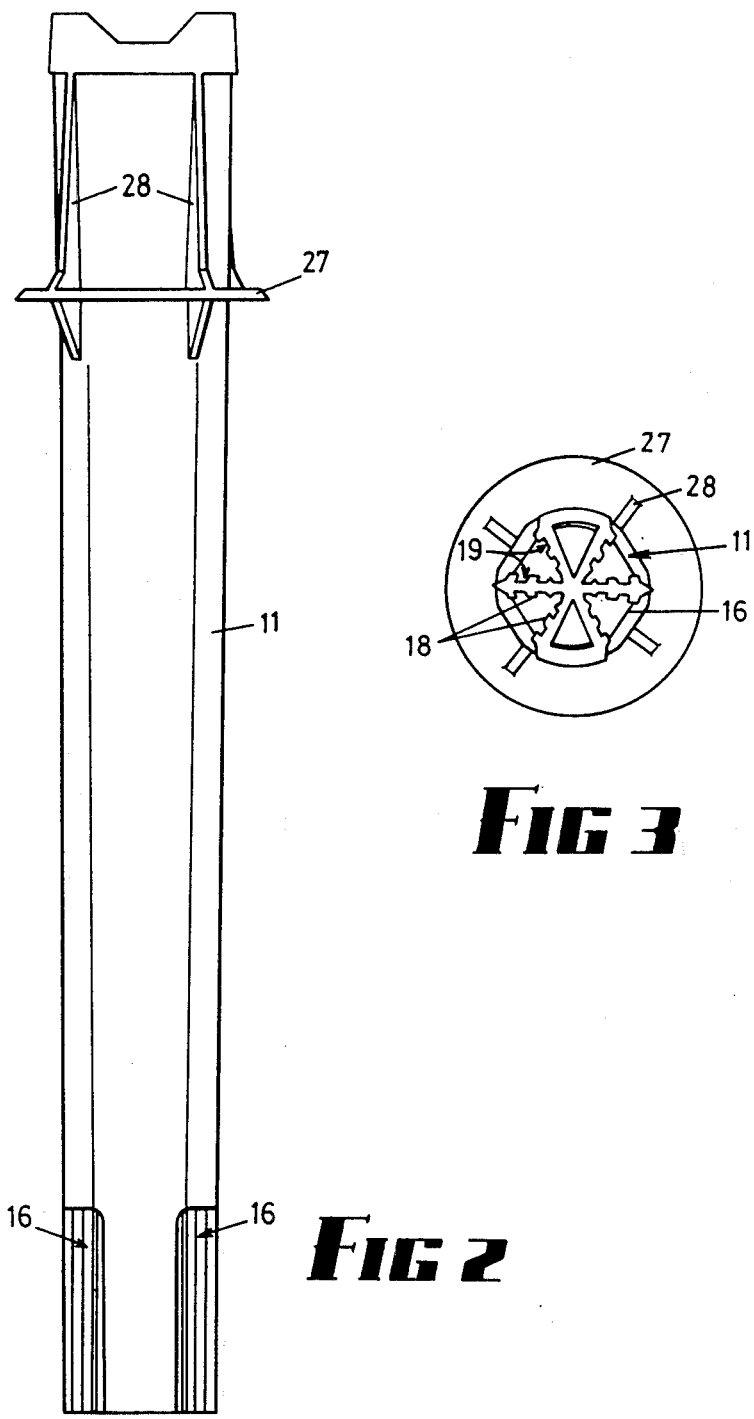

SUPPORT TROLLEY

This invention relates to a support trolley which is useful for supporting an appliance, for example, an evaporative air cooler, although the support trolley of the invention can be used for a number of other purposes.

BACKGROUND OF THE INVENTION

There are many appliances, for example television sets, evaporative coolers, chairs, desks, stands and others which require to be supported by a support trolley, but the existing support trolleys or other systems which are available are of high cost and are not always aesthetically pleasing.

Another problem which is encountered is that previously use has been made of metal members which are fastened by metal fasteners, and this adds considerably to the cost, and establishes stress concentration points, and an object of this invention is to provide a support trolley which is aesthetically pleasing, which can be made entirely of plastics materials, and which can be assembled with the use of few if any fasteners.

BRIEF SUMMARY OF THE INVENTION

In this invention a support trolley comprises a central leg pillar and at least three legs radiating therefrom, each supported at its outer end by a respective castor wheel assembly. The inner end of each leg joins the lower end of the leg pillar by a sliding engagement of complementary splined surfaces, so that assembly or disassembly is easily effected. The outer end of each leg has a downwardly facing recess which receives the upwardly directed pintle of a respective castor wheel assembly, that pintle being tubular and of resilient material.

With this invention, the interconnection between the inner ends of the leg arms and the lower end of the leg pillar in comprising a plurality of interengaging spline surfaces, results in a very rigid interengagement without the need for fasteners to be used.

More specifically, the invention consists of a central leg pillar, at least three legs radiating from the lower end of the leg pillar, and castor wheel assemblies supporting respective radially outer ends of the legs, the lower end of the leg pillar and the inner end of each leg having surfaces which interengage upon movement in an axial direction of that leg along the leg pillar to thereby firmly secure that leg to the leg pillar, and surfaces defining sockets at the outer ends of respective said legs which receive upwardly extending pintles of said castor wheel assemblies.

BRIEF DESCRIPTION OF THE DRAWINGS

An embodiment of the invention is described hereunder in some detail with reference to, and is illustrated in, the accompanying drawings in which FIG. 1 is a perspective view of a support trolley made in accordance with this invention, showing one leg disconnected from its leg pillar, FIG. 2 is a side elevation of the leg pillar, FIG. 3 is an underside (inverted) plan view of FIG. 2.

Figures 4, 5:
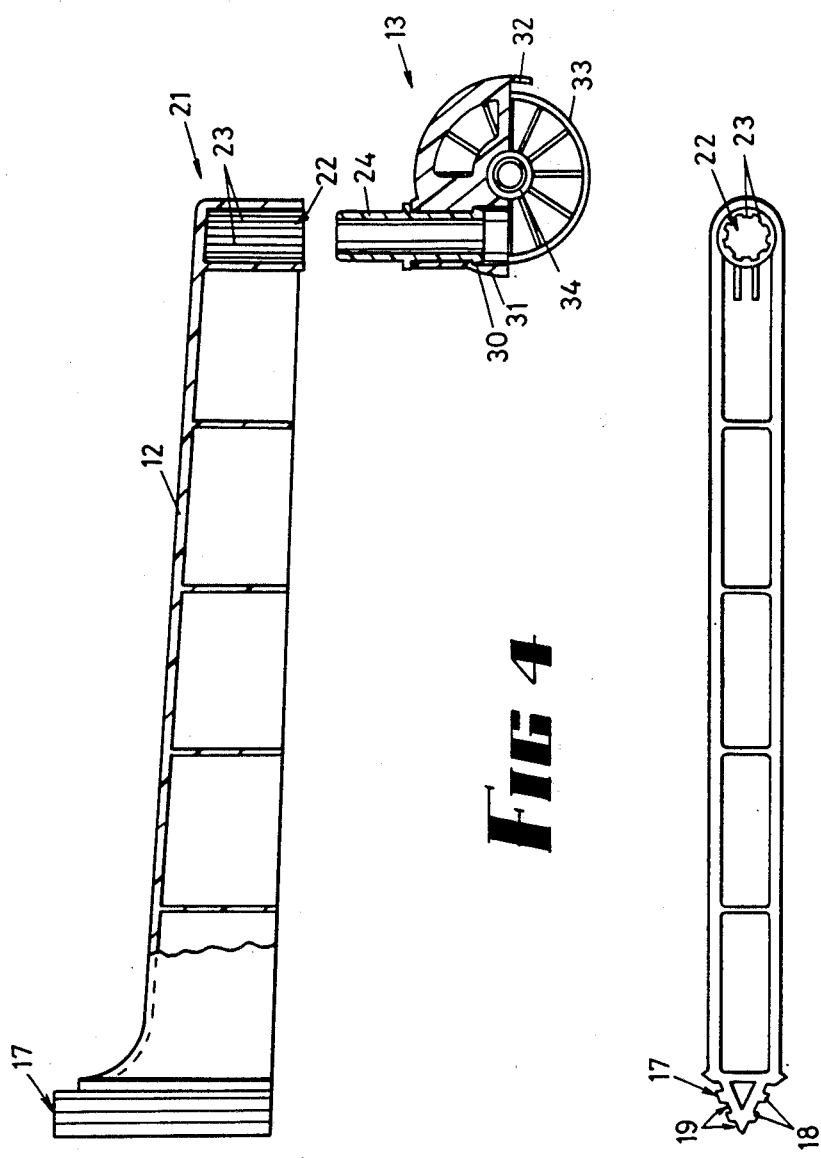
FIG. 4 is a partly sectioned elevation of a leg, and includes also a central elevational sectional view of a castor wheel assembly "exploded" from the leg.
FIG. 5 is an underside (inverted) plan view of FIG. 4.

In this embodiment a support trolley comprises a central leg pillar 11, with at least three legs 12 (in this embodiment four legs 12) radiating from the lower end of the leg pillar 11, and castor wheel assembly 13 supporting respective radially outer ends of the legs 12.

As seen best in FIGS. 3 and 5, the lower end of the leg pillar 11 contains four generally triangular recesses 16, and these receive the radially inner ends 17 of the legs 12, each of which, as shown in FIG. 5, also has a triangular envelope shape and plan. Both the inner ends 17 of the legs and the surfaces which define the triangular recesses 16 are provided with ribs 18 and grooves 19 which constitute spline surfaces, and in order to achieve a degree of firmness, there is a very small upward convergance of the interengaging spline surfaces. With this arrangement, the inner ends of the legs 17 can be readily positioned and firmly engaged within the traingular recesses 16 or removed therefrom for dismantling purposes.

The outer ends 21 of the legs 12 each contain generally circular sockets 22 and the inner socket walls of which comprise a plurality of inwardly directed ribs 23 (FIG. 5) and these sockets receive the upwardly extending pintles 24 of the castor wheel assemblies 13 with an interference fit sufficient to retain the pintles in position under normal usage conditions, but the assemblies 13 can be removed therefrom by axial movement of the pintles 24 away from the walls of their respective sockets 22.

In many instances the support trolley can be utilised without any additional support excepting the upper end thereof, but in this embodiment there is provided an annular support flange 27 near the upper end of the leg pillar 11 which supports abutment surface of the base tank of an evaporative cooler (not shown). The flange 27 is stiffened by gussets 28.

As seen best in FIG. 4, the lower end of each pintle 24 terminates in a barb 30 which retains the frame 31 of the castor wheel assembly 13 against dislodgement, the frame 31 having a shroud 32 which extends over two cup shaped wheels 33 which are co-axial with one another and which have concave surfaces facing one another, the cup shaped wheels 33 being independently rotatable in and supported by respective bearings 34 in the frame 11. Since the cup shaped wheels face one another but are spaced from one another, there is considerable resistance to any sliding movement over a supporting substrate and the castor wheels of this invention "track" with great accuracy and minimum oscillation or deviation from any direction of travel.

The trolley according to this invention can be very quickly and easily assembled or dismantled and this is of some advantage in freighting of the trolleys. The inter connection between leg pillar and legs is so firm that threaded fasteners are not required under normal circumstances. The product can be produced entirely from moulded polymeric materials, and can therefore be of small cost even though the design is such that it is mechanically strong.

I claim:

1. A support trolley comprising a central leg pillar, at least three legs radiating from the lower end of the leg pillar, and castor wheel assemblies supporting respective radially outer ends of the legs, the lower end of the leg pillar having a first engaging means integral with said pillar, the inner end of each leg having a second engaging means, said first and second engaging means comprising mating V-shaped upwardly converging splined surfaces which removably interengage upon movement in an axial direction of that leg along the leg pillar to thereby firmly secure that leg to the leg pillar, and surfaces defining sockets at the outer ends of respective said legs which receive upwardly extending pintles of said castor wheel assemblies.

2. A support trolley according to claim 1 wherein the leg pillar comprises an annular support flange radiating outwardly therefrom near its upper end.

3. A support trolley according to claim 1 wherein said V-shaped second engaging means on the radially inner end of each said leg has a generally triangular envelope shape in plan defined in part by two said upwardly converging splined surfaces, and said V-shaped first engaging means on the lower end of said leg pillar has a plurality of inwardly directed recesses also defined in part by said upwardly converging splined surfaces each having a shape complementary to the shape of the mating said splined surfaces of a respective said leg.

4. A support trolley according to claim 1 wherein the radially outer end of each said leg has surfaces defining a downwardly opening recess, said leg recess surfaces including radially inwardly directed ribs which extend axially, the pintle of each said castor wheel assembly being of circular tubular cross-section and of deformable material, and engaging surfaces of said ribs of a respective recess with an interference fit sufficient to retain the pintle in position under normal usage conditions.

5. A support trolley according to claim 4 wherein the lower end of each said pintle terminates in a barb, and each said castor wheel assembly has a sleeve rotatable about its said pintle and retained thereto by said barb.

6. A support trolley according to claim 4 wherein each said castor wheel assembly comprises a pair of spaced co-axial cup-like wheels, the concave surfaces of which are directed towards each other.

7. A trolley support comprising:

a central leg pillar having a longitudinal axis and being formed at its lower end with a plurality of engaging means integral with said pillar, said engaging means being shaped and configured to removably receive elements having mating structure;

at least three leg members, each leg member being formed with said mating structure at one end thereof, said legs extending radially from said pillar when said engaging means and said mating structure are interengaged;

one of said engaging means or said mating structure being formed as an outwardly oriented V-shaped female opening slot, the sides of said opening being formed as a splined surface with alternating ribs and grooves arranged substantially parallel with said axis of said pillar;

the other of said engaging means or said mating structure being formed as a complementary V-shaped male element, the sides of said male element being formed as a splined surface with alternating ribs and grooves arranged to mate with the splined surface of said female opening, said mating splined surfaces providing substantially enhanced bearing surface areas between said pillar and said leg members, thereby strengthening the connection and reducing the possibility of relative motion therebetween after interengagement.

8. The trolley support recited in claim 7, and further comprising surfaces defining a socket at the opposite end of each said leg member, said socket being adapted to receive and retain pintles of caster wheel assemblies.

9. The trolley support recited in claim 7, wherein said splined surfaces are matingly, upwardly converging so that interengagement therebetween is in the manner of a wedge, thereby facilitating secure interengagement.

10. A support trolley comprising a central leg pillar, at least three legs radiating from the lower end of said leg pillar, and castor wheel assemblies supporting respective radially outer ends of the legs;

the lower end of the leg pillar and the inner end of each leg having upwardly converging splined surfaces which interengage upon movement in an axial direction of that leg along said leg pillar to thereby firmly secure that leg to said leg pillar;

the radially inner end of each said leg having a generally triangular envelope shape in plan defined in part by two said upwardly converging splined surfaces;

the lower end of said leg pillar having plurality of inwardly directed recesses also defined in part by said upwardly converging splined surfaces each having a shape complementary to the shape of the mating said splined surfaces of the respective said leg;

surfaces defining sockets at the outer ends of respected said legs which receive upwardly extending pintles of said castor wheel assemblies.

* * * * *